(12) United States Patent
Filippi et al.

(10) Patent No.: US 7,314,603 B2
(45) Date of Patent: Jan. 1, 2008

(54) HETEROGENEOUS CATALYTIC REACTOR WITH A MODULAR CATALYTIC CARTRIDGE

(75) Inventors: Ermanno Filippi, Castagnola (CH); Enrico Rizzi, Grandate (IT); Mirco Tarozzo, Ligornetto (CH)

(73) Assignee: Methanol Casale S.A. (CH)

( * ) Notice: Subject to any disclaimer, the term of this patent is extended or adjusted under 35 U.S.C. 154(b) by 725 days.

(21) Appl. No.: 10/450,348

(22) PCT Filed: Oct. 2, 2002

(86) PCT No.: PCT/EP02/11025

§ 371 (c)(1),
(2), (4) Date: Jun. 12, 2003

(87) PCT Pub. No.: WO03/031048

PCT Pub. Date: Apr. 17, 2003

(65) Prior Publication Data

US 2004/0018124 A1    Jan. 29, 2004

(30) Foreign Application Priority Data

Oct. 4, 2001  (EP) ................................. 01123804

(51) Int. Cl.
*B01J 8/02*  (2006.01)
*F28D 7/00*  (2006.01)

(52) U.S. Cl. ..................... 422/211; 422/198; 422/200; 422/201; 422/190

(58) Field of Classification Search ................ 422/188, 422/189, 190, 191, 192, 193, 198, 200, 211, 422/216, 219

See application file for complete search history.

(56) References Cited

U.S. PATENT DOCUMENTS

| 4,102,652 A | 7/1978 | Vogl |
| 4,225,562 A | 9/1980 | Anderson |
| 2002/0018740 A1* | 2/2002 | Filippi et al. ............... 422/198 |

FOREIGN PATENT DOCUMENTS

| DE | 2 016 614 A | 10/1971 |
| EP | 0 483 975 A1 | 5/1992 |
| EP | 0 995 491 A1 | 4/2000 |

* cited by examiner

*Primary Examiner*—Glenn Caldarola
*Assistant Examiner*—Kaity V. Handal
(74) *Attorney, Agent, or Firm*—Akerman Senterfitt

(57) ABSTRACT

An heterogeneous chemical reactor of the type with a partial opening, incorporating a catalytic cartridge comprising a substantially cylindrical basket (11) suitable for containing a predetermined amount of a predefined catalyst is distinguished by the fact that the basket (11) is modular and is made of a plurality of containers (14) which are structurally independent from each other, which can be manipulated individually and which are associated with each other to form the basket (11) in a reciprocally removable way, each container (14) being of a suitable size to pass through the partial opening (9) of the corresponding reactor (1).

11 Claims, 5 Drawing Sheets

HETEROGENEOUS CATALYTIC REACTOR WITH A MODULAR CATALYTIC CARTRIDGE

DESCRIPTION

1. Field of Application

The present invention refers to a heterogeneous catalytic reactor of the type comprising a substantially cylindrical shell closed at the opposite ends by respective bottoms, a reaction zone or environment defined in such shell, at least one catalytic cartridge (or catalytic bed), supported in such reaction zone.

In particular, but not for limiting purposes, this invention concerns a reactor of the above considered type and defined in the technical jargon "with a partial opening", in other words a reactor, generally having a large capacity (large or very large size), equipped at one of its bottoms with a manhole for access to the inside thereof.

Even more precisely, the present invention refers to a catalytic cartridge, which can be used for a heterogeneous catalytic reactor with a partial opening.

2. Prior Art

It is known that to carry out heterogeneous, exothermic or endothermic chemical reactions of the catalytic type both so-called adiabatic reactors and so-called pseudoisothermal, or in short, isothermal reactors, are widely used.

In adiabatic reactors the reaction takes place without any heat exchange for which reason the reaction temperature increases and decreases according to if such reaction is exothermic or endothermic. In this case, the catalytic cartridge, also called catalytic bed in the rest of the description, supported in the reaction zone of each reactor, substantially consists of a container basket, of an appropriate size, suitable for containing a predetermined amount of a predefined catalyst and suitable to be passed through, in an axial and/or radial direction, by reactant gases and by gaseous reaction products.

In isothermal reactors, the reaction temperature is controlled through a continuous and suitable heat exchange, carried out in the catalytic bed. In this case, the catalytic cartridge, supported in the reaction zone of the corresponding reactor, comprises a container basket of the predefined catalyst and a plurality of heat exchangers, immersed in the catalyst together with their hydraulic connections to corresponding pluralities of supply, distribution, collection and discharge ducts for an operating heat exchange fluid. Moreover, in the same basket are positioned and supported all the "auxiliary" devices deemed useful for the control of a given chemical reaction and for the continuous detection of the operating variables, as well as for the direction of the reactant gas flows, of the reaction products and, when used, of the heat exchange fluids.

When they have a large capacity, in other words are of a large size (axial length and diameter), the chemical reactors of the type considered generally have a partial opening. In other words, they are equipped with an appropriate manhole for access to the inside thereof, where the respective catalytic cartridges are housed.

The manufacture procedure (preparation and positioning of the so-called "inner elements"—catalytic cartridge, heat exchanger and possible auxiliary devices) of chemical reactors with a partial opening, even though they are widely used, has a recognized technical drawback which has not been overcome yet: long shutdown times of the plant required for changing the catalyst, or for any other intervention for the maintenance/repair of the auxiliary components of the catalytic bed, or for revamping technically obsolete catalytic reactors.

Taking, as an example, the case of revamping, where the existing cartridges are replaced with new cartridges that are literally built within such reactors, extracting and introducing all the necessary material through the respective manholes.

Otherwise, one thinks of the example of ammonia synthesis in tubular or plate-shaped reactors, where the catalyst used is made up of iron granules, therefore very hard and tough, and where a compacting of the catalyst can take place during operation. In this case, the catalyst cannot be discharged for its replacement with a new load anymore and the entire reactor generally is scrapped.

SUMMARY OF THE INVENTION

The problem underlying the present invention is that of providing a catalytic cartridge for chemical reactors with a partial opening of the type considered above, with structural characteristics such that the drawback cited above with respect to the prior art is completely and cost-effectively overcome.

This problem is solved, according to the present invention, by a catalytic cartridge for heterogeneous catalytic reactors of the type with a partial opening, comprising a substantially cylindrical basket suitable for containing a predetermined amount of a predetermined catalyst, characterized in that such basket is modular and is made of a plurality of containers that are structurally independent from each other, which can be individually manipulated and are mutually associated in a reciprocally removable manner to form such basket, each container being of a size suitable to pass through such partial opening of the corresponding reactor.

Advantageously, each container is substantially structured and configured as a cylinder sector and has an axial length equal to or less than that of such basket, preferably, a submultiple thereof.

In accordance with a further embodiment of the present invention, inside each container the heat exchange elements and/or the "auxiliary" devices for controlling the chemical reaction are advantageously fitted.

Preferably, a cylinder sector container, the mass of predetermined catalyst loaded therein, the possible heat exchange elements immersed in such catalyst, as well as the possible auxiliary devices fitted in such container, constitute a unit that can be manipulated individually.

Further characteristics and the advantages of the present invention will become clearer from the detailed description of an embodiment of a chemical reactor equipped with a catalytic bed or catalytic cartridge according to the invention, given hereafter with reference to the enclosed indicative and non-limiting drawings.

DETAILED DESCRIPTION

Figure 1:
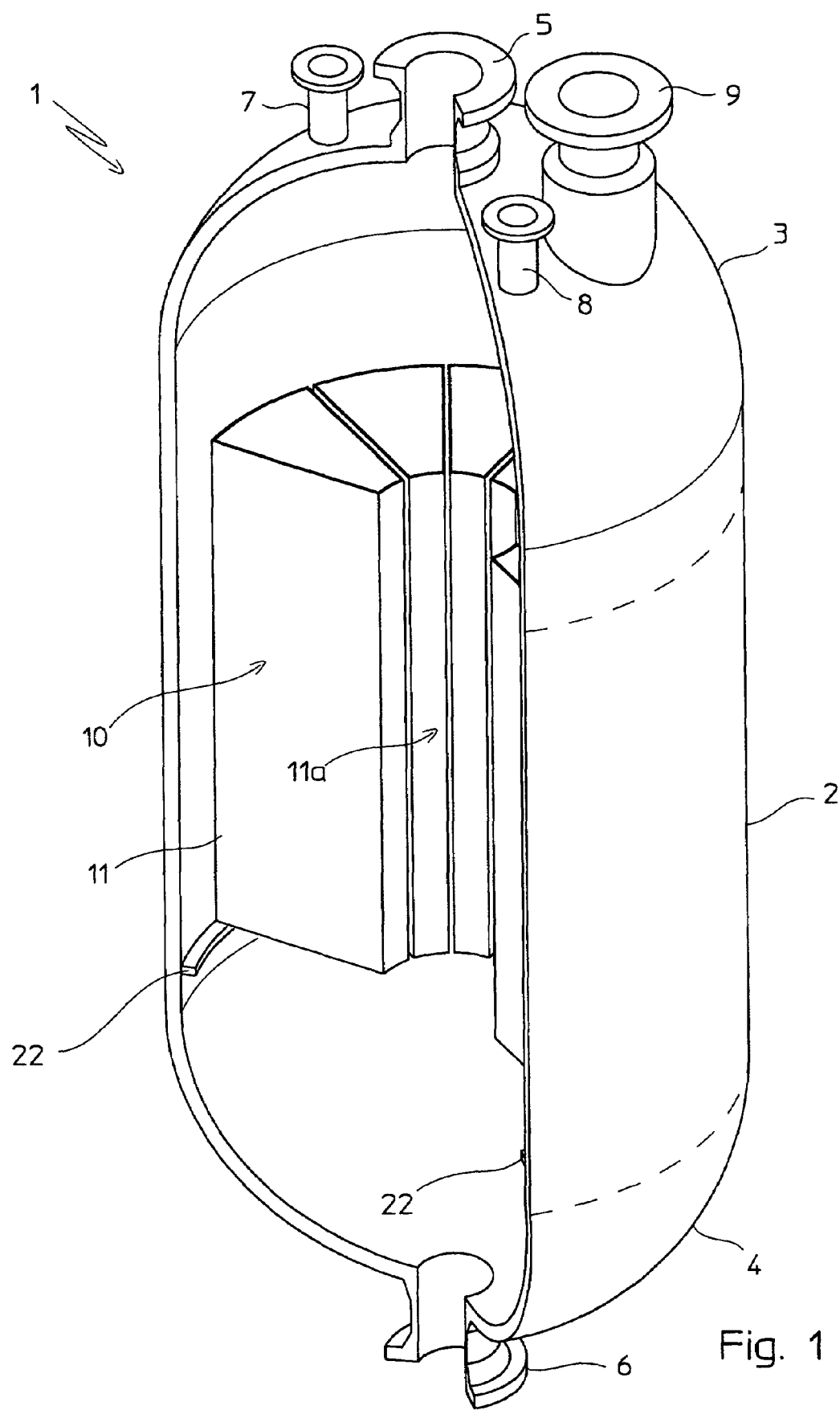
FIG. 1 schematically shows in perspective and in partial section a heterogeneous catalytic reactor incorporating a catalytic cartridge according to the present invention.

With reference to FIG. 1, with 1 is indicated, as a whole and schematically, a heterogeneous catalytic reactor of the type comprising a cylindrical shell 2 (or pressure vessel), with a vertical axis, closed at the opposite ends by respective bottoms, upper 3 and lower 4, which form a single piece with such shell 2 and that are equipped with passages 5, 6 for the inlet of reactant gases and the outlet of reaction products, and with passages 7, 8 for possible operating fluids (like, for example, a heat exchange fluid), which are useful for controlling the chemical reaction which one intends to carry out, as described hereafter. More precisely, but not for limiting purposes, the aforementioned reactor 1 is of the type with a partial opening, in other words it is equipped, at the upper bottom plate 3, with a manhole 9 with a smaller diameter than the internal diameter of the shell 2, for accessing the inside of the shell 2.

Inside the reactor 1, a reaction zone is defined in which a substantially cylindrical catalytic cartridge 10 (or catalytic bed) which is coaxial and concentric with such shell 2 is supported with per se known means which are not represented. The cartridge 10 comprises a basket 11, with a structure and size to contain a predetermined amount of a predefined catalyst.

Depending on the chemical reaction to be carried out, on the method (adiabatic or pseudoisothermal) and technique preferred for carrying out said reaction, the basket 11 must allow the reactant gases and the reaction products to pass through the catalytic mass loaded therein, in an axial direction, or in a radial or axial-radial direction, with reference to the axis of the shell 2. For such a purpose said basket 11 can be equipped with a perforated bottom wall and full side walls (in the case of axial crossing), or else a full bottom wall and perforated side walls (in the case of axial-radial crossing), or finally full upper and lower bottom walls and perforated side walls (in the case of radial crossing).

In the enclosed drawings, an application of the present invention to a catalytic cartridge 10 that can be used in pseudoisothermal reactors of the so-called radial or axial-radial type, in other words a catalytic cartridge structured to allow the gases to pass through the catalytic mass in a radial or axial-radial direction, is illustrated for non-limiting purposes. In this case, said catalytic cartridge 10 can comprise, as will become clearer from the rest of the description, a possible heat exchange unit, fitted inside the respective basket 11, immersed in the catalyst, as well as possible devices used for controlling and regulating the operating parameters of the chemical reaction which one intends to carry out, like, for example, thermocouples, flow meters and pressure taps. In the case of the reactant gases and the gaseous reaction products passing radially through the catalyst, the basket 11 has on the whole a cylindrical form with an annular cross section, suitable for defining a passage or axial duct 11a, intended to receive the gaseous reaction products and to convey them outside of the reactor 1 or else to distribute the gaseous reactants in the basket 11.

Figure 2:
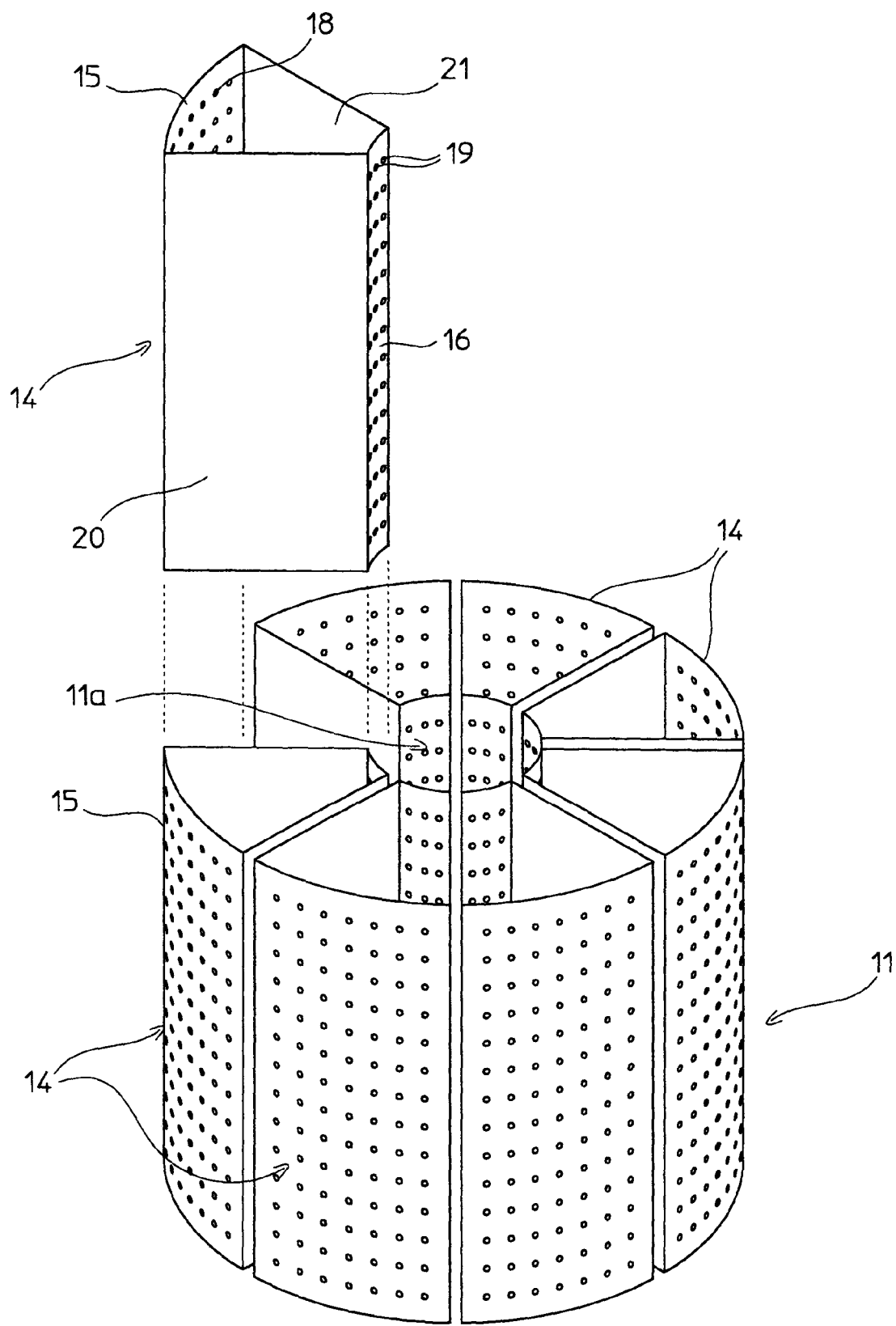
FIG. 2 shows in perspective, a catalytic cartridge according to the invention on an enlarged scale and on separated parts, which can be used for pseudoisothermal chemical reactors.
Figure 3:
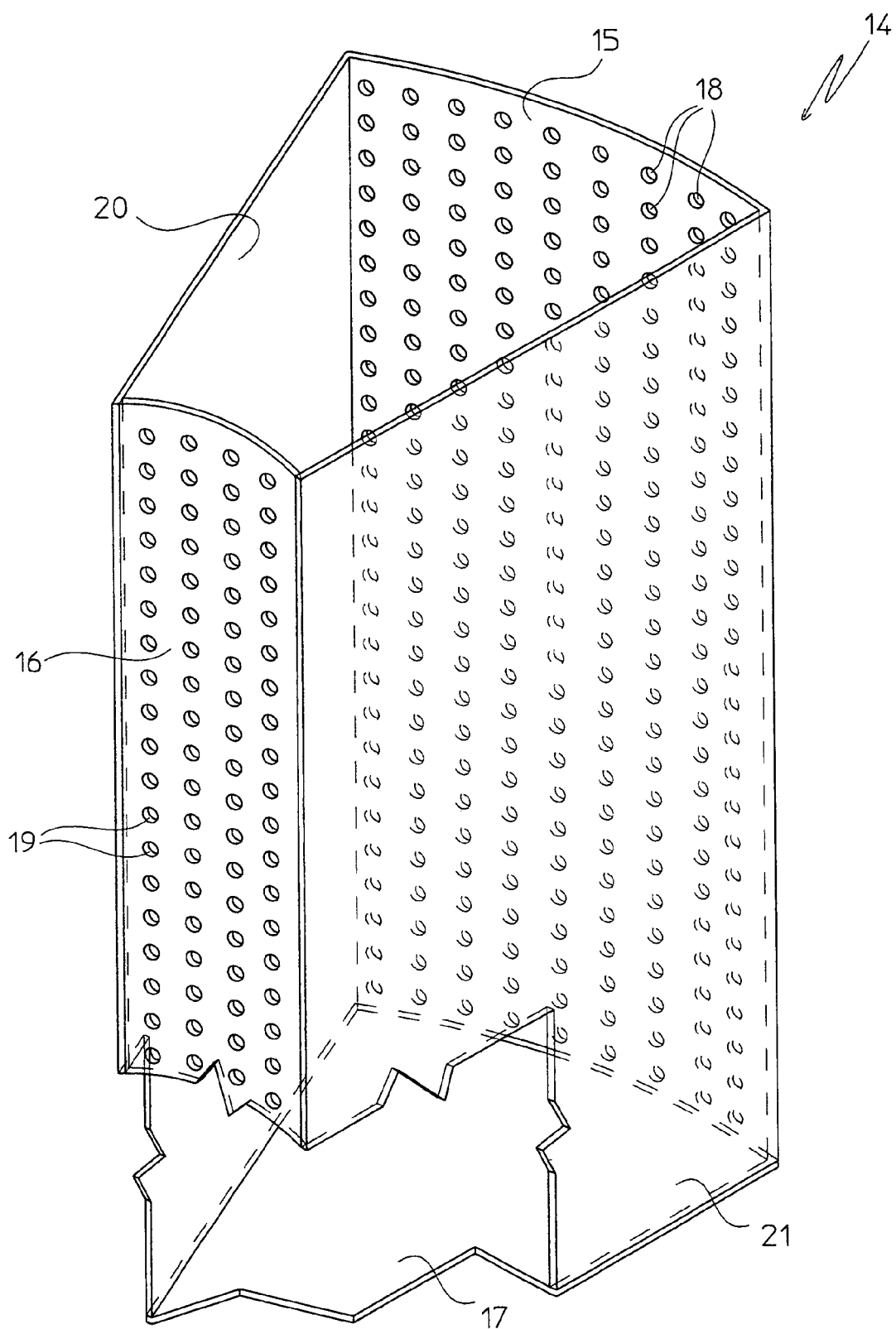
FIG. 3 shows on an even larger scale a detail of FIG. 2.

With reference to FIGS. 2 and 3, in accordance with a feature of the present invention, said basket 11 is made of a plurality of containers 14 that are structurally independent from each other, which can be manipulated individually and are associated with each other in a reciprocally removable way. Each container 14 is of a size suitable for passing through said manhole 9.

According to another feature of this invention, each container 14 is structured and configured as a cylinder sector, having an external wall 15 and an internal wall 16, which are curvilinear (having the shape of the arc of a circle), coaxial and with convexity curving towards the outside of said basket 11, as well as a bottom 17. The aforementioned external and internal walls are equipped with respective pluralities of holes 18, 19 to allow the passage of the gases, whereas the bottom wall 17 is full (non perforated). Two side walls 20, 21, which converge and extend radially with respect to the axis of such basket 11, complete the cylinder sector container 14 under consideration.

Advantageously, each cylinder sector container 14 has an axial length equal to that of said basket 11, but in particular cases it can be realised with an axial length which is a submultiple of or at least less than that of the basket 11 which one intends to obtain. In this last case, two or more containers 14 can be placed on top of each other so as to obtain a total axial length that is equal to that of the basket 11.

The baskets 14, filled with a predetermined catalyst outside of the reactor 1, are introduced one after the other in said reactor through the manhole 9 and are arranged in the shell 2, on an appropriate per se conventional support 22 (FIG. 1). Said containers 14 are fixed in a removable way onto the support 22 close to each other but preferably not in contact with each other laterally, in order to allow possible circumferential expansions of the containers themselves during the operation of the reactor 1.

When arranged for operation, the aforementioned cylinder sector containers 14 define the planned basket 11, complete with outer and inner, cylindrical and perforated walls; moreover the internal wall of such basket 11 is configured as an axial cylindrical pipe 11a.

In accordance with another feature of the present invention (FIG. 4), inside each container 14, 25 respective heat exchange elements are fitted, intended to operate immersed in the catalyst intended for such container. Advantageously, said elements 25 are made of flattened plate-shaped exchangers with a rectangular configuration, substantially arranged in a radial way, with its long sides 25a parallel to the axis of the respective cylinder sector container 14 and its short side 25b extending radially. Preferably, the exchangers 25 of each cylinder sector container 14 are mutually connected so as to constitute a unit that can be manipulated individually, the connection advantageously being made of collection and distribution ducts, 26 and 27, respectively, of a predetermined operating heat exchange fluid. The collection and distribution ducts 26, 27 are in turn connected—with per se known means such as connection tubes—to the passages 7 and 8 of the reactor 1 for supplying and extracting operating fluids, respectively. To facilitate a centred and stable positioning of such a heat exchange unit in the basket container 14, the lateral exchangers of such unit are equipped with spacers 28, of an appropriate size to rest against the side walls of said container 14.

Analogously, possible devices 29 for the detection and control of the chemical-physical parameters of the chemical reaction that one intends to carry out can be fitted in the containers 14 in a removable way.

Figure 4:
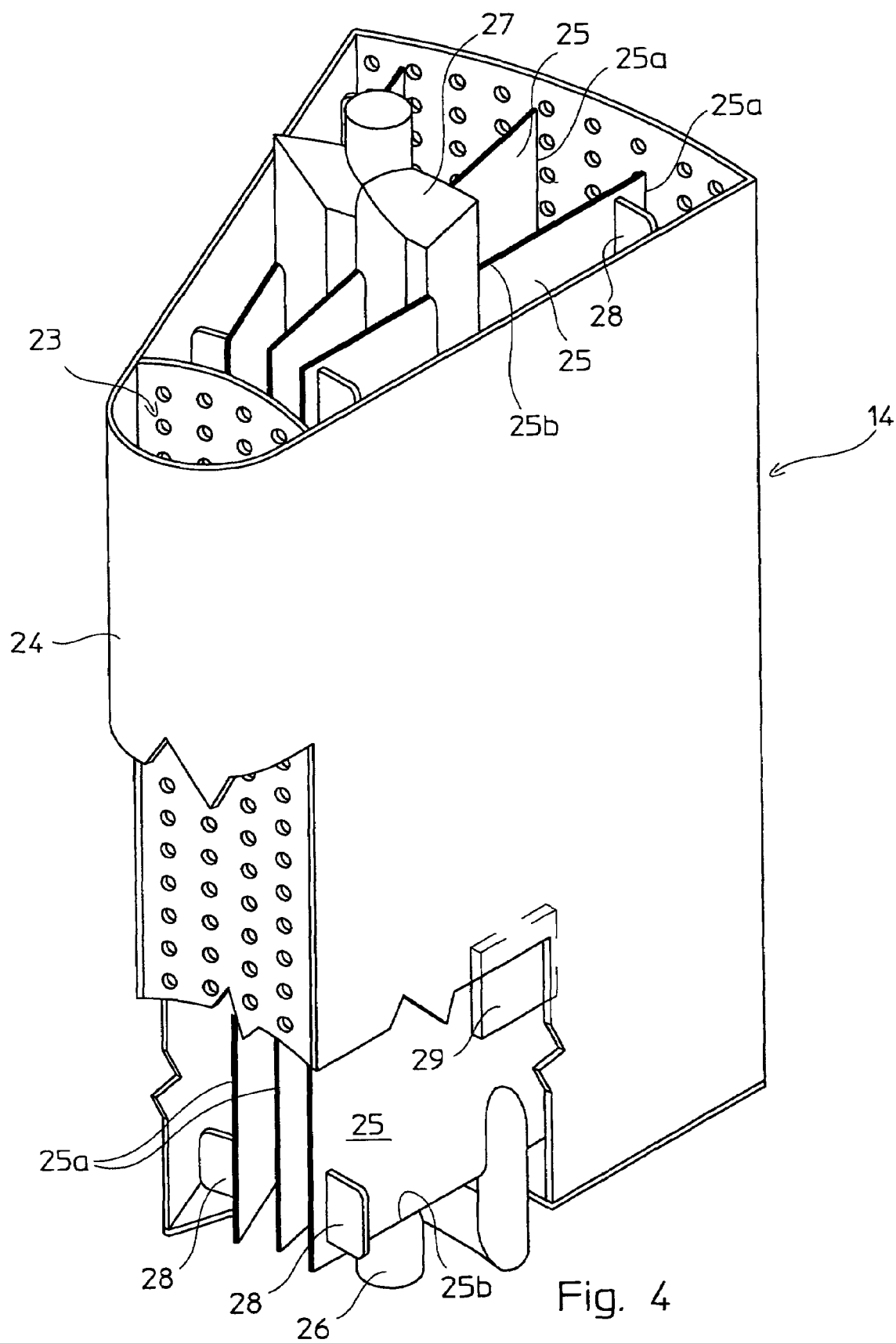
FIG. 4 shows an alternative embodiment of the detail of FIG. 3.

Still according to the example of FIG. 4, each container 14 can advantageously be integrally equipped, at the internal wall, with a semi-cylindrical appendage 24, adapted to constitute a duct 23 for the supply into or else the extraction from the relative container 14 of the reactant gases or of the reaction products, respectively.

Figure 5:
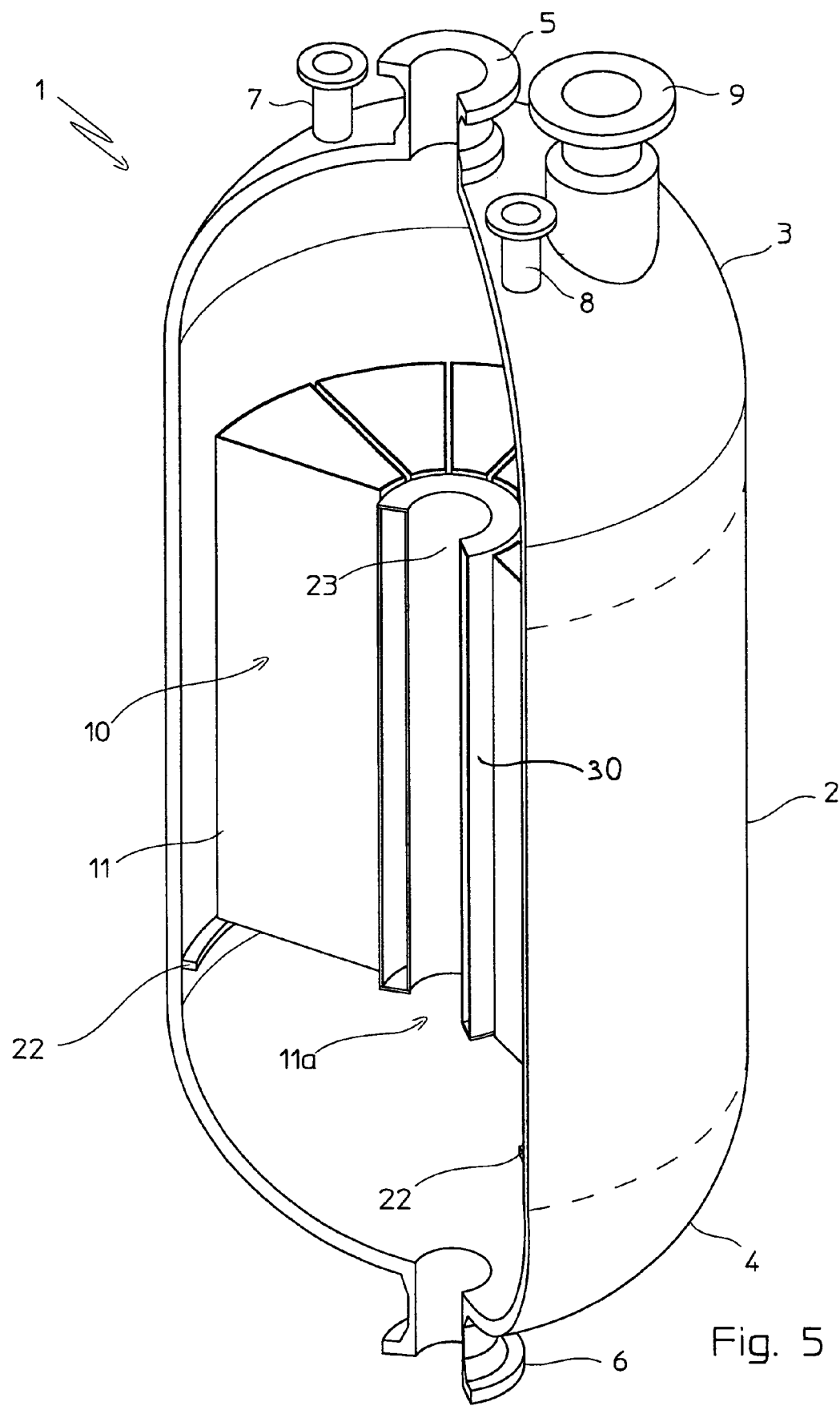
FIG. 5 shows a heterogeneous catalytic reactor incorporating a catalytic cartridge according to an alternative embodiment of the present invention.

In FIG. 5, a catalytic reactor 1 is shown incorporating a catalytic cartridge 10 according to an alternative embodiment of the present invention that comprises, in addition to the basket 11, also a cylindrical annular basket 30 for containing a predetermined amount of catalyst.

In such a figure, the features of the reactor 1 structurally and functionally equivalent to those illustrated in FIG. 1 are indicated with the same reference numbers and are not described any further.

In accordance with an advantageous feature of the present invention, the basket 30 is of a suitable size to pass through the manhole 9 of the reactor 1.

Once filled with a predetermined catalyst outside of the reactor 1, the basket 30 is inserted into such reactor through the manhole 9 and is housed in the axial cylindrical duct 11*a* defined by the internal wall of the basket 11. Such a basket 30 advantageously allows the reaction volume (catalytic mass) inside the reactor 1, and thus its capacity, to be increased.

Means per se known, and thus not represented, such as support beams, rings or shafts can be used to support the basket 30 inside the axial cylindrical duct 11*a*. Preferably, the external diameter of the basket 30 is less than the internal diameter of the basket 11 so as to obtain a space between the baskets to allow possible circumferential expansions of the baskets themselves during the operation of the reactor 1.

In the same way as the basket 11, the basket 30 also allows—depending on the specific case—the reactant gases and the reaction products to pass through the catalytic mass loaded therein, in an axial direction or in a radial or axial-radial direction, with reference to the axis of the shell 2. For such a purpose, said basket 30 can be equipped with a perforated bottom wall and full side walls (in the case of axial crossing), or else a full bottom wall and perforated side walls (in the case of axial-radial crossing), or even full upper and bottom walls and perforated side walls (in the case of radial crossing).

Advantageously, the basket 30 has an axial length equal to that of such basket 11, but in particular cases it can be realised in a plurality of cylindrical annular containers placed one on the top of the another (not represented) having a submultiple axial length or which is anyhow inferior to that of the basket 11.

The internal wall of the basket 30 defines a cylindrical passage adapted to constitute a duct 23 for the supply into or else the extraction from the basket itself of the reactant gases or of the reaction products, respectively. It should be noted how in the case of a radial or axial-radial crossing of the catalytic cartridge 10, the baskets 11 and 30 can be in fluid communication with each other through respective internal and external contiguous perforated side walls of such baskets.

The cylinder sector containers 14 and the basket 30 with the respective amount of catalyst loaded therein, the heat exchange elements 25 immersed in such catalyst and the possible devices 29, fitted in such containers, constitute respective heat exchange units that can be manipulated individually, which are prepared outside the respective reactor with a partial opening and in which they are introduced, one after the other, through the manhole 9. Moreover, such units can favourably constitute "pre-manufactured" modular units.

The so conceived invention is subject to variations and changes, all falling within the scope of protection defined by the following claims.

The invention claimed is:

1. Catalytic cartridge for heterogeneous chemical reactors of the type with a partial opening, comprising a substantially cylindrical basket, suitable for containing a predetermined amount of a predefined catalyst, characterized in that such basket is modular and is made of a plurality of containers that are structurally independent from each other, which can be manipulated individually, and which are associated to form such basket in a reciprocally removable way, each container being of a suitable size to pass through said partial opening of the corresponding reactor and respective heat exchange elements being fitted inside each container wherein the heat exchange elements are immersed in the catalyst.

2. Catalytic cartridge according to claim 1, wherein each container is substantially structured and configured as a cylinder sector.

3. Catalytic cartridge according to claim 2, wherein each cylinder sector container has an axial length equal to or less than that of said basket.

4. Catalytic cartridge according to claim 1, wherein at least part of such heat-exchange elements is made of exchangers of the so-called plate exchanger type.

5. Catalytic cartridge according to claim 2, wherein at least one respective plate exchanger having a flattened substantially rectangular configuration, arranged with the long side parallel to the axis of such container and with the short side extending radially with respect to it, is fitted inside each container.

6. Catalytic cartridge according to claim 1, wherein auxiliary devices for controlling the chemical reaction that one intends to carry out in such reactor are arranged in each container.

7. Catalytic cartridge according to claim 1, wherein it further comprises a cylindrical annular basket for containing a predetermined amount of a predefined catalyst, being of a size suitable for passing through said partial opening of the corresponding reactor and to be housed in an axial duct defined by an internal wall of said substantially cylindrical basket.

8. Catalytic cartridge according to claim 3, wherein at least one respective plate exchanger having a flattened substantially rectangular configuration, arranged with the long side parallel to the axis of such container and with the short side extending radially with respect to it, is fitted inside each container.

9. Modular unit to obtain a catalytic cartridge with a substantially cylindrical configuration and intended for pseudoisothermal chemical reactors of the type with a partial opening, wherein said modular unit comprises a container for containing a portion of a predetermined amount of predefined catalyst for said catalytic cartridge, wherein said container has a substantially cylinder sector configuration and is of a suitable size to pass through said partial opening of the corresponding reactor, and wherein said container is defined by a first external cylindrical wall which is coaxial and concentric with a second internal cylindrical wall, two side walls extending radially between said first external cylindrical wall and said second internal cylindrical wall and a bottom wall, said first external cylindrical wall and said second internal cylindrical wall being perforated, said side walls and said bottom wall being imperforated and at least one heat exchanger fitted in said container, wherein said heat exchanger is immersed in the catalyst when contained in the container.

10. Module unit according to claim 9, wherein said at least one heat exchanger is plate-shaped, with a flattened substantially rectangular configuration.

11. Modular unit according to claim 10, wherein at least one auxiliary device for controlling and regulating the parameters of the chemical reaction which one intends to carry out, is fitted in said container.

\* \* \* \* \*